June 23, 1931.  H. S. COVER  1,811,614
BINOCULAR OPTICAL INSTRUMENT
Filed Aug. 22, 1928   2 Sheets-Sheet 1

Witnesses:
K. W. Fischer
E. Appleton

Inventor:
Harvey, S. Cover.
By Joshua R H Folk
His Attorney

June 23, 1931.  H. S. COVER  1,811,614
BINOCULAR OPTICAL INSTRUMENT
Filed Aug. 22, 1928  2 Sheets-Sheet 2
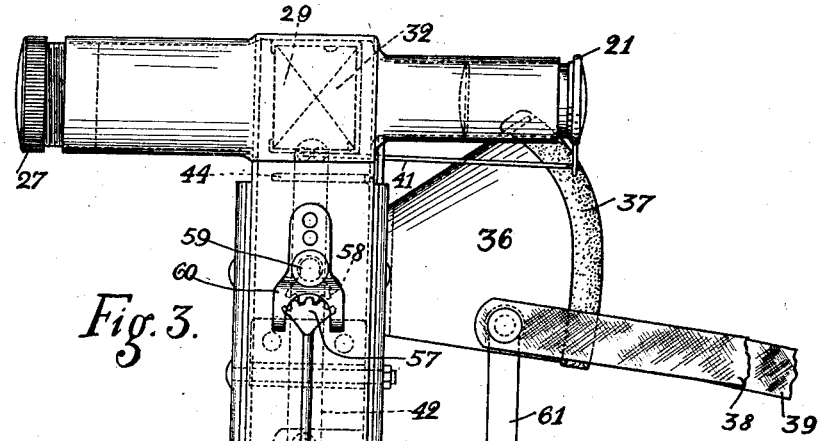
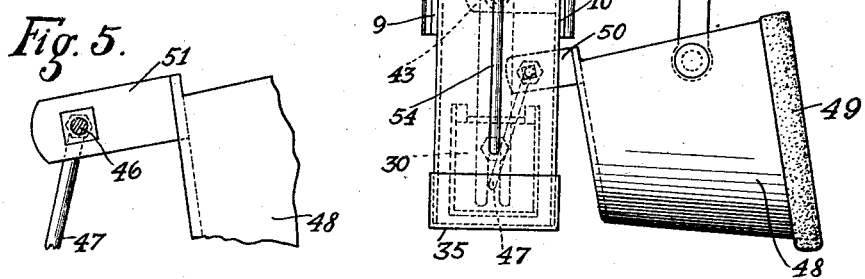
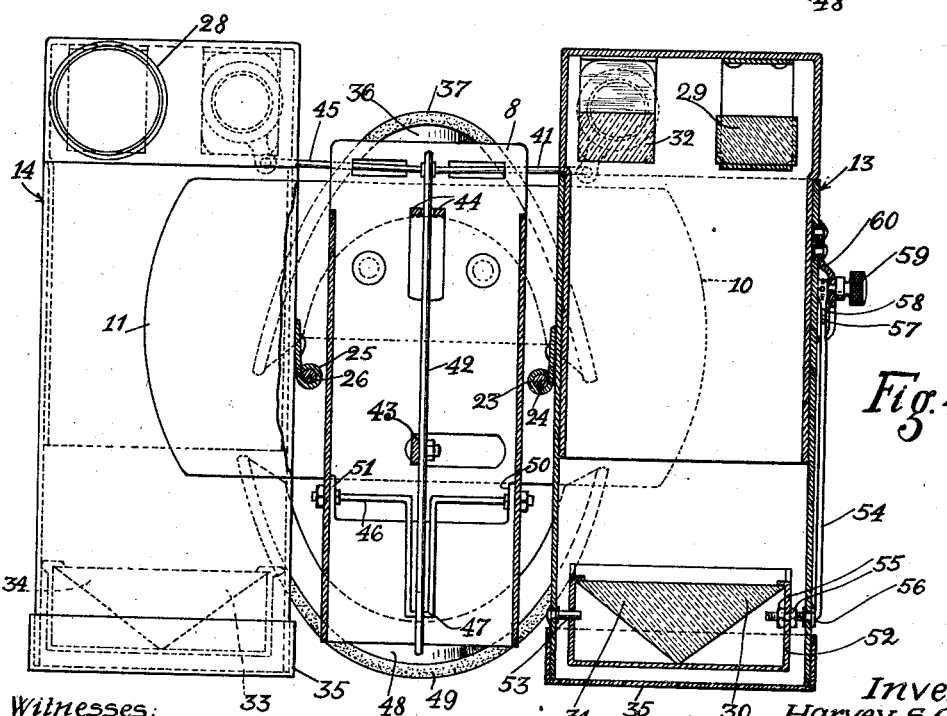
Witnesses:
K. W. Fischer
F. C. Appleton
Inventor:
Harvey S. Cover
By: Joshua R. H. Roth
His Attorney.

Patented June 23, 1931

1,811,614

UNITED STATES PATENT OFFICE

HARVEY S. COVER, OF SOUTH BEND, INDIANA

BINOCULAR OPTICAL INSTRUMENT

Application filed August 22, 1928. Serial No. 301,220.

This invention relates to a binocular optical instrument and pertains more particularly to an instrument employing prisms.

An object of the invention is the provision of an instrument of this type in a novel compact form which by the employment of reflecting prisms produces a relatively high magnifying power.

A further object is to provide a binocular optical instrument in which the light rays are received on substantially the same horizontal plane as the eyes, are then diverted to a point remote from the horizontal plane of the eyes and reflected back to said plane, whereby a telescopic effect is produced in an instrument of comparatively small size and convenient form, permitting the instrument to be held with the arms placed comfortably against the body.

Further objects are to provide an instrument of this type adaptable to pupillary adjustment to suit different individuals and also provided with adjusting means for compensating for any distortion in the light rays caused either by the pupillary adjustment or otherwise, whereby the instrument has the capacity of stereoscopic adjustment such that the image of both eyes may be accurately superimposed and brought to registry.

An additional object is the provision of a novel nose piece or rest to steady and sustain the instrument while in use, and a movable jaw piece by means of which the focal length may be increased or decreased by moving the jaw of the user.

Other objects will appear hereinafter.

The invention consists in the combinations and arrangements of parts hereinafter described and claimed.

The invention will be best understood by reference to the accompanying drawings forming a part of this specification, and in which:

Fig. 3 is a side elevational view;

Fig. 4 is a view partly in section taken on the line 4—4 of Fig. 2;

Fig. 5 is a detailed view of the connection between the pivoted jaw piece and the shaft for operating the focusing lever.

Figure 1:
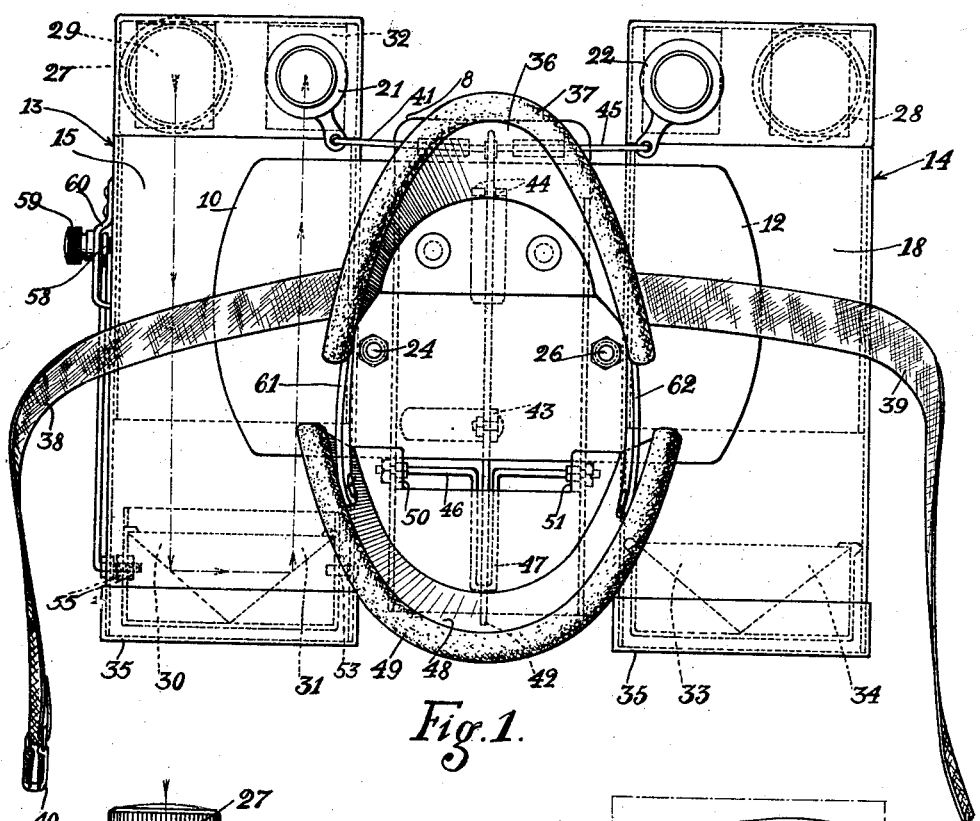
Fig. 1 is a front elevational view of the instrument.
Figure 2:
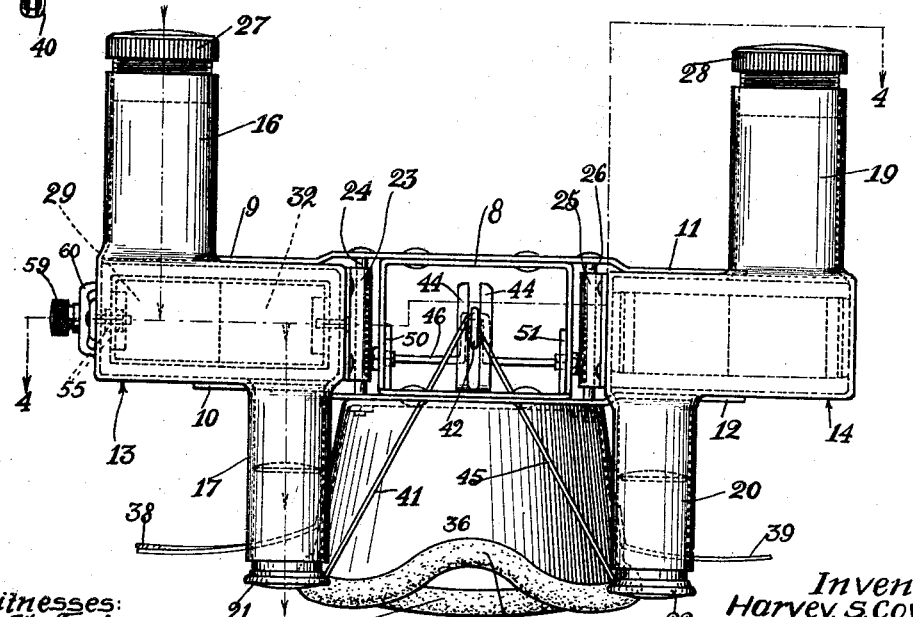
Fig. 2 is a plan view.

As illustrated in the drawings, the preferred embodiment of the invention comprises a central frame member 8 preferably provided with laterally extending plate flanges 9, 10, 11 and 12. Flanges 9 and 10 are adapted to act as supports and guides for the left light transmission member 13; and similarly flanges 11 and 12 support and act as vertical guides for light transmission member 14. Member 13 comprises a downwardly projecting telescopic extension 15, a laterally extending objective tube 16, and a laterally extending ocular tube 17. Similarly member 14 comprises a downwardly extending telescopic member 18, a laterally extending objective tube 19 and a laterally extending ocular tube 20. It will be noted that objective tubes 16 and 19 are not in alignment with ocular tubes 17 and 20, and the latter are preferably positioned so that the ocular lenses 21 and 22 are separated a distance equal to the normal interpupillary distance between the eyes, but to permit of adjustment of this distance to suit different individuals, member 13 has secured thereto a tubular member 23 through which extends a bolt 24 secured on the outer sides of flanges 9 and 10, and the latter frictionally engage member 13 which is thus permitted to be adjusted upon bolt 24 as a pivot and is maintained by plate flanges 9 and 10 in any adjusted position. The opposite member 14 is similarly provided with a tubular attachment 25 through which extends bolt 26 permitting of the same adjustment as member 13. Objective lenses 27 and 28 are preferably screw threaded into the ends of objective tubes 16 and 19 respectively, and inasmuch as the direction of light is the same in both members 13 and 14 a description with reference to member 13 alone will suffice. The light passing through objective lens 27 is reflected at right angles downwardly by prism 29; thence through the total reflecting prisms 30 and 31 which return the direction of light upwardly in contact with single prism 32 whence it is directed through ocular lens 21. By the present prismatic system the reflection from prism 32 presents the image in an inverted position and therefore in using the instrument for terrestrial purposes which is preferred, the oculars 21 and 22 may be of the negative Huygens type for the purpose of reversing the image to upright position. Obviously, it is but necessary to substitute a positive Ramsden type of ocular to convert the instrument to an astronomical telescope. Member 14 is similarly provided with total reflecting prisms 33 and 34, corresponding to prisms 30 and 31, positioned at the lower end of tubular member 18. Members 15 and 18 are preferably rectangular in shape so as to provide a convenient means of holding the instrument by the hands when not otherwise supported as hereinafter described, and each is provided at its lower end with a cap 35.

A nose piece 36 preferably provided with a cloth or felt edge covering 37, is secured to the forward portion of frame 8 and serves to steady the instrument and hold it in proper relation to the eyes, and preferably elastic bands 38 and 39 are secured to the nose piece 36 and are adapted to be placed around the head of the wearer and secured by a buckle 40, in which manner the instrument is supported by the head leaving the hands free.

In the present embodiment of the invention, the focal length to suit the particular individual is increased or decreased by means of the ocular lenses 21 and 22 which are slidably mounted in the respective ocular tubes. A link 41 connects lens 21 with the upper end of a lever 42 which is pivotally mounted upon a stamped projection 43 of the frame member 8, and which also is held in vertical alignment by guides 44. Link 45 similarly connects lens 22 with the upper end of lever 42. Pivotally mounted in the lower part of frame 8 is a transverse rod 46 having a central offset crank portion 47 adapted to extend through a slot provided adjacent the lower end of lever 42. A jaw piece 48 appropriately shaped to fit the jaw of the average wearer and provided with felt or other suitable edge protection 49, is mounted upon rod 46 by means of ears 50 and 51, each of which is preferably provided with a square or irregular shaped opening to fit upon a correspondingly shaped portion of rod 46, (as shown in Fig. 5) whereby movement of member 48 will serve to oscillate rod 46, causing lever 42 to be moved upon its pivotal connection 43 by means of crank extension 47, and thus advance or retard the position of ocular lenses 21 and 22 simultaneously.

Thus, it will be seen that pupillary adjustment may be had by moving the members 13 and 14 relative to each other upon the pivotal mountings 24 and 26, but when this is done it may become necessary to adjust one of the total reflecting prisms to obtain proper stereoscopic vision. For this purpose total reflecting prisms 30 and 31 are supported in a bracket 52, one side of which is provided with an opening adapted to fit over a pin 53 and a threaded extension on rod 54 projects through the opposite side of bracket 52 whereby the entire prism may be shifted laterally by means of adjusting nuts 55 which permit a proper horizontal stereoscopic adjustment. To provide for proper vertical stereoscopic adjustment rod 54 is adapted to oscillate upon point 56 and has its upper end provided with a segmental gear 57 adapted to mesh with a similar gear 58 mounted upon an extension of knurled knob 59 supported by bracket 60, as shown in Figs. 3 and 4. Thus by turning knob 59, bracket 52 which supports prisms 30, 31, is swung upon a horizontal axis represented by the pivot points 53 and 56, enabling the correction of any vertical lack of stereoscopic registry. Jaw member 48 is normally maintained upwardly in contact with the jaw of the observer by means of elastic straps 61 and 62.

The operation of the instrument will be apparent from the foregoing description and it will be seen that the instrument includes telescopic as well as stereoscopic characteristics, embraced in a convenient, compact device whereby the rays of light initially enter the instrument in substantially the same plane as the eyes of the observer, from which plane they are reflected to a point remote from the plane and back again to the plane and thence through oculars to the eyes of the observer. The instrument is adapted to be supported by the nose piece and supporting straps independently of the hands, or may be conveniently supported by the hands if desired. The adjustment of the focal length is accomplished by the pivotally mounted jaw engaging member. The wide range of adjustments renders it unnecessary to secure the services of an expert should the instrument become out of alignment or require pupillary adjustment.

While I have described and illustrated the preferred form of construction for carrying my invention into effect, this is capable of variation and modification without departing from the spirit of the invention. I, therefore, do not wish to be limited to the precise details of construction as set forth, but desire to avail myself of such variations and modifications as come within the scope of the appended claims.

Having thus described my invention, what I claim as new and desire to secure by Letters Patent is:

1. A binocular optical instrument, comprising a central frame member, a pair of telescopic members, each provided with a total reflecting prism operatively interposed between an objective and an ocular lens, one of said telescopic members being pivotally connected to said frame member at a point axially offset from the ocular lens, and one of said total reflecting prisms being shiftably and rotatably mounted for lateral and rotative movements to obtain proper stereoscopic vision between said telescopic members.

2. A binocular optical instrument, comprising a central frame member, a pair of light transmission members mounted upon opposite sides of said frame member, each of said light transmission members provided with a total reflecting prism operatively interposed between an objective and an ocular lens, a pivotal connection between one of said light transmission members and said frame member at a point axially offset from the ocular lens, and one of said total reflecting prisms being shiftably and rotatably mounted for lateral and rotative movements to obtain proper stereoscopic vision between said telescopic members.

3. A binocular optical instrument, comprising a central frame member, a pair of telescopic members mounted upon opposite sides of said frame member, each of said telescopic members including an objective lens and an ocular lens, each ocular lens slidably mounted in the respective telescopic members, a pair of link members connecting said ocular lenses for causing their movement in unison, and a jaw engaging piece operatively connected to said link members.

4. A binocular optical instrument, comprising a central frame member, a pair of telescopic members mounted upon opposite sides of said frame member, each of said telescopic members including an objective lens and an ocular lens, each ocular lens slidably mounted in the respective telescopic members, a pair of link members connecting said ocular lenses for causing their movement in unison, and a jaw engaging piece pivotally mounted upon said frame member and operatively connected to said link members.

5. A binocular optical instrument, comprising a central frame member, a pair of telescopic members mounted upon opposite sides of said frame member, each of said telescopic members including an objective lens and an ocular lens, each ocular lens slidably mounted in the respective telescopic members, a pair of link members connecting said ocular lenses for causing their movement in unison, a jaw engaging piece pivotally mounted upon said frame member, and a lever pivotally mounted upon said frame member and connected upon said jaw engaging piece and said link members.

6. A binocular optical instrument, comprising a central frame member, a pair of telescopic members mounted upon opposite sides of said frame member, each of said telescopic members including an objective lens and an ocular lens, each ocular lens slidably mounted in the respective telescopic members, a pair of link members connecting said ocular lenses for causing their movement in unison, a jaw engaging piece operatively connected to said link members, and a nose piece rigidly mounted upon said frame member and formed to rest upon the nose of the user.

7. A binocular optical instrument, comprising a central frame member, a pair of telescopic members mounted upon opposite sides of said frame member, each of said telescopic members including an objective lens and an ocular lens, each ocular lens slidably mounted in the respective telescopic members, a pair of link members connecting said ocular lenses for causing their movement in unison, a jaw engaging piece operatively connected to said link members, a nose piece rigidly mounted upon said frame member and formed to rest upon the nose of the user, and a strap secured to said nose piece and arranged to encircle the head of the user.

In testimony whereof I have signed my name to this specification.

HARVEY S. COVER.